(12) United States Patent
Ma

(10) Patent No.: US 6,733,547 B2
(45) Date of Patent: May 11, 2004

(54) METHOD OF MAKING A PASTE COMPOSITION FOR LEAD ACID BATTERY

(75) Inventor: Daxing Ma, Carmel, IN (US)

(73) Assignee: Delphi Technologies, Inc., Troy, MI (US)

(*) Notice: Subject to any disclaimer, the term of this patent is extended or adjusted under 35 U.S.C. 154(b) by 179 days.

(21) Appl. No.: 10/012,848

(22) Filed: Dec. 10, 2001

(65) Prior Publication Data

US 2003/0106205 A1 Jun. 12, 2003

(51) Int. Cl.[7] .......................... H01M 4/21; H01M 4/20; H01M 4/62
(52) U.S. Cl. .................. 29/623.5; 429/215; 429/228; 429/217; 141/1.1
(58) Field of Search ................. 429/215, 217, 429/228; 29/623, 5; 141/1.1

(56) References Cited

U.S. PATENT DOCUMENTS

| | | | | |
|---|---|---|---|---|
| 2,644,023 A | * | 6/1953 | Rasch | 429/215 |
| 4,110,519 A | * | 8/1978 | Nilsson | 429/217 |
| 4,130,695 A | * | 12/1978 | Dietz et al. | 429/215 |
| 4,315,829 A | * | 2/1982 | Duddy et al. | 252/182.1 |
| 6,617,071 B2 | | 9/2003 | Chen et al. | |

FOREIGN PATENT DOCUMENTS

JP  2001229920  * 8/2001

* cited by examiner

Primary Examiner—John S. Maples
(74) Attorney, Agent, or Firm—Jimmy L. Funke

(57) ABSTRACT

A composition and plate-making process for a lead acid battery for reducing active material shrinkage in negative battery plates. A polymer is mixed with lead oxide, water, an expander and sulfuric acid to form a negative paste composition comprising the expander and basic lead sulfate crystals with the polymer absorbed on the crystal surfaces. The paste having the polymer addition is then pasted onto a grid where the paste is dried, cured and reacted to form a negative battery plate of the lead acid battery. The negative battery plate comprises a sponge lead negative active mass that exhibits less shrinkage by virtue of the polymer addition.

28 Claims, 3 Drawing Sheets

METHOD OF MAKING A PASTE COMPOSITION FOR LEAD ACID BATTERY

FIELD OF THE INVENTION

This invention relates to batteries, and more particularly to a paste composition for lead acid batteries.

BACKGROUND OF THE INVENTION

Lead acid batteries are the oldest and best-known energy devices in automobile applications. A common process to manufacture flat-pasted plate lead acid batteries is shown schematically in FIG. 1. Pure lead 10 is converted in step 20 to a 70–80% oxidized lead powder (lead oxide) in a Barton pot or a ball mill with a range of grain size distribution. For the positive paste, the mixing step 30 includes placing the dry lead oxide powder from step 20 in a positive mixing machine, such as a 3000 pound paste mixer, with water 40 and $H_2SO_4$ 50 and mixing under constant stirring and at an elevated temperature. For the negative paste, mixing step 60 includes placing the dry lead oxide powder from step 20 in a negative mixing machine, such as a 3000 pound paste mixer, with water 40, $H_2SO_4$ 50 and an expander 70 and mixing under constant stirring at ambient temperature. The pastes formed from mixing steps 30 and 60, depending on the ratio of starting materials, the rate of mixing and the temperature, contain mixtures of the initial powders, lead sulfate, and basic lead sulfates such as $PbOPbSO_4$ (monobasic lead sulfate), $3PbOPbSO_4 \cdot H_2O$ (tribasic lead sulfate), and $4PbOPbSO_4$ (tetrabasic lead sulfate).

After a period of mixing, the pasting step 80 includes pressing the respective pastes on the expanded grids by a specially designed machine to prepare the positive and negative plates. To prevent sticking of the plates, the positive and negative plates are surface dried in an oven prior to stacking them on the skids, as indicated at steps 90,100 respectively. To improve the active material/grid contact and the mechanical strength of the active material, the skids with positive plates from step 90 are subjected to a steaming and curing process 110, which includes transporting the positive plates to a steam chamber for several hours and then to a curing room for about 3–4 days. During steaming and curing 110, further reaction of the ingredients occurs, resulting in a different ratio of the lead oxides, sulfate and basic lead sulfates. The resulting cured material is a precursor to lead dioxide, which forms the active material in the plates. The skids with negative plates from step 100 are also subjected to a curing process 115.

After curing is complete, the plates from steps 115 and 110 are transported to assembly 120 and a green battery is formed. The formation step 130 includes electrochemically oxidizing the precursor material for the positive electrode to lead dioxide and for the negative electrode to sponge lead, typically by adding sulfuric acid into the assembled cells. The finishing step, also 130, includes dumping the forming acid, refilling the batteries with the shipping acid, and sealing the batteries with a final cover.

The charging and discharging reactions for the positive and negative plates are as follows:

Negative:

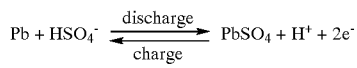

Positive:

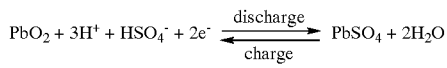

Overall:

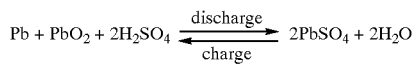

During charging of the positive plate, the complex sulfates are converted into lead dioxide. This then becomes the positive active mass. When the cell is discharged, lead dioxide changes to lead sulfate. As the cell is recharged, lead sulfate changes back to lead dioxide, and this process keeps repeating. The negative plate construction is similar to the positive plate. The paste has similar ingredients and an additional material called an expander. The expander provides conditions during forming that result in the formation of high surface area lead "spongy" active mass at the negative collector surface. So, the negative cure paste starts out as sulfates etc., and during charging changes in to lead "structures". When the cell is discharged, lead changes to lead sulfate. Thus, the negative active mass cycles between lead and lead sulfate.

When the batteries are constantly under-charged or deep discharged in application, a portion of the discharge product $PbSO_4$ is never converted to the negative active material Pb on the negative plates. The crystal size of the unconverted $PbSO_4$ increases during cycling, and larger void sizes may thereby form around the growing crystals. This results in shrinkage of the negative active mass, and thus degradation of the structure of the negative active mass. Eventually, the cell will lose its capacity to a point where it is no longer useful as a result of the shrinkage.

There is thus a need to develop a paste composition, and method to produce such paste, where shrinkage of the negative active mass is decreased during the cycling of the battery.

SUMMARY OF THE INVENTION

The present invention provides a paste composition for the negative plate, and a plate making process for a lead acid battery, which reduces shrinkage of the negative active mass during battery cycling. To this end, and in accordance with the present invention, a negative paste is produced by mixing an oxidized lead powder and sulfuric acid with an expander, a polymer and optionally carbon black to produce a paste comprising tribasic lead sulfate crystals, the expander and the polymer in which the reduction of $Pb^{2+}$ to Pb during battery formation and cycling is facilitated by the polymer absorbed on the inactive lead sulfate crystals. After mixing the negative paste composition, the resulting paste is then pasted onto a grid where the paste is dried and cured to form a negative battery plate of the lead acid battery. The process and composition produces negative plates with reduced shrinkage in the negative active mass, and thus high performance and long cycling life for the battery.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Figure 1:
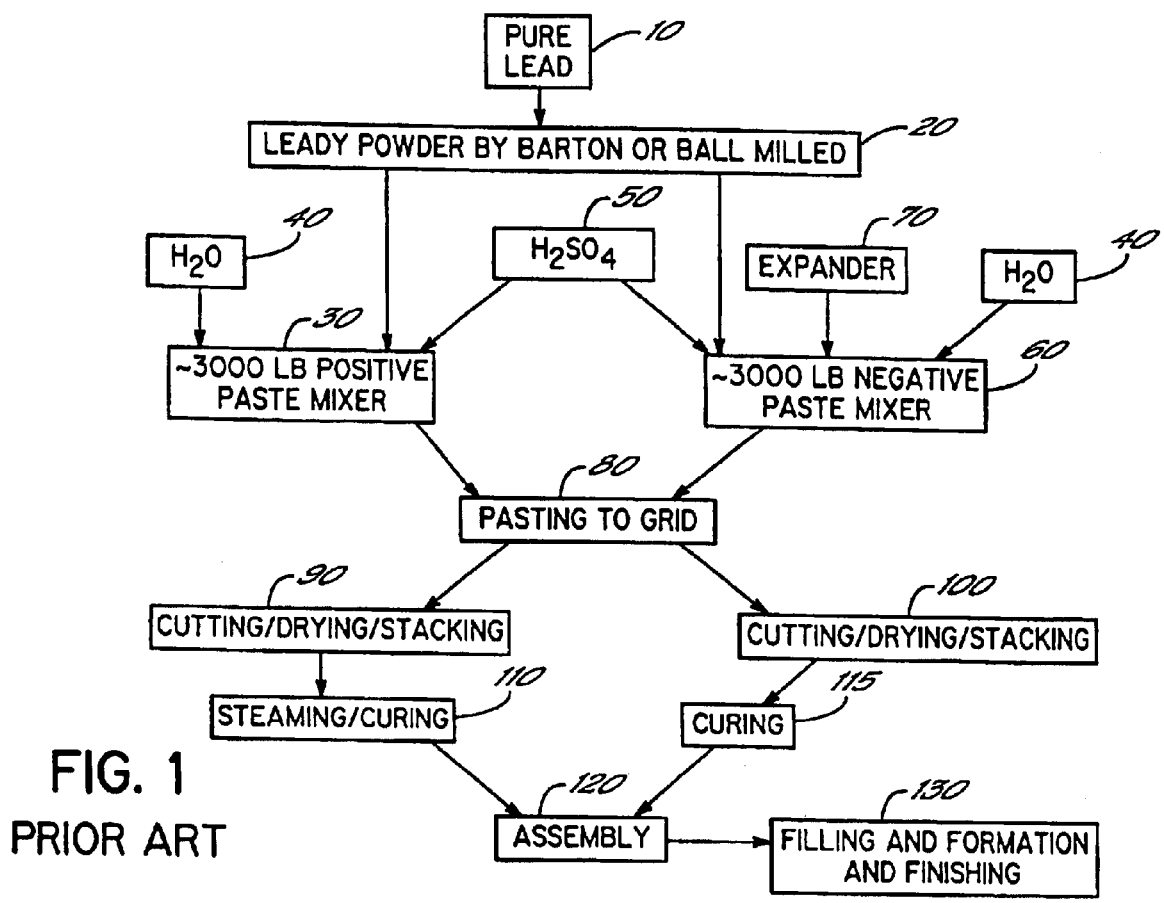
FIG. 1 is a flow diagram of the conventional method of manufacturing lead acid batteries using flat pasted plates.

The present invention provides a composition and manufacturing process for lead acid batteries that produces negative plates with low shrinkage of the active mass. The plates have better performance and longer cycling life than plates produced by current technology. Battery discharge and recharge ability is improved and the battery self-discharge rate is decreased. To this end, and in accordance with the present invention, the negative active material composition includes a polymer addition. Due to the non-conductivity of the polymer, an amount of carbon black is optionally added to increase the conductivity of the negative active mass, if desirable or necessary. The polymer and optional carbon black may be mixed with the expander, lead oxide, sulfuric acid and water in any of a variety of manners, as will be further illustrated below with respect to FIGS. 2–6.

The plate making process of the present invention uses the same starting material as in conventional processes, specifically mixtures of lead oxide, with the only difference being the addition of the polymer and optional carbon black. Thus, the present invention maintains a low starting material cost. By way of example, the starting material may include various forms of lead oxide, such as orthorhombic lead oxide, tetragonal lead oxide and leady oxide, which is a combination of lead oxide and elemental lead. For ease of discussion, these various forms of lead oxide will be referred to simply as lead oxide.

The expander conventionally includes, for example, carbon black, $BaSO_4$, and a lignosulfonate. The expander composition used in traditional negative plates achieves high reaction surface area of the negative active materials. Lignosulfonates are generally composed of hydrophilic and hydrophobic portions in the polymeric chains. An exemplary commercially available lignosulfonate is Vanisperse A. The expander is generally added to the composition in an amount of about 1 wt. % of the total weight of the lead oxide.

Selection of an appropriate polymer for addition to the paste mixture includes consideration of the chemical resistance of the polymer to the sulfuric acid used to form the paste, the polymer's thermal stability at temperatures of 50° C. or higher, the polymer's ability of absorption onto the lead grid surface, and the polymer's environmental safety and cost. Suitable polymers include generally those having C—OH or C=O functional groups. Exemplary polymers for use in the present invention include polyvinylpyrrolidone and polyvinyl alcohol. In a further exemplary embodiment, the polymer is added to the composition in an amount of about 0.01–2 wt. % of the total weight of the lead oxide.

A good ionic conductivity inside the plates is also important for high formation efficiency. In addition to adding polymers, and due to the non-conductivity of the polymer, it may be desirable to add a high conductivity material to the paste composition to increase the overall conductivity of the paste. Carbon black is ideal for this purpose. As carbon black is generally already present in the expander, the present invention contemplates adding an optional amount of carbon black in addition to that present in the expander. While reference is made herein to carbon black as an exemplary high conductivity material, the present invention should not be so limited. Any material compatible with the paste composition that increases the conductivity of the overall paste to counter any negative effect that might be observed by the non-conductive polymer addition may be used in accordance with the present invention. The amount of high conductivity material to be added is dependent upon the amount of material added and the desired conductivity of the negative paste. Moreover, for small polymer additions where the conductivity of the paste has not been significantly affected by the addition, it may be unnecessary to add the additional carbon black. Thus, the high conductivity material is an optional additive in accordance with the present invention.

Figure 2:
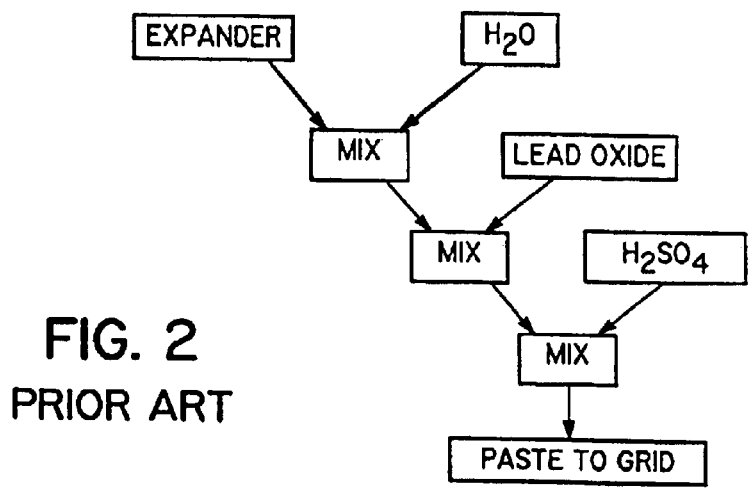
FIGS. 2–6 are flow diagrams of various exemplary embodiments of the method of the present invention for mixing the negative paste for use in making lead acid batteries.

The polymer and optional additional carbon black may be added at any of various stages in the conventional negative paste mixing process. Referring to FIG. 2, a flow diagram is provided illustrating the conventional method for mixing of the negative paste. Conventionally, the expander is first mixed in the negative mixing machine with water. Lead oxide is then added to the negative mixing machine and further mixing occurs. Finally, sulfuric acid is added to the mixing machine to form the negative paste, whereby the sulfuric acid and lead oxide react to form tribasic lead sulfate crystals. Thus, step 60 of FIG. 1 is conventionally a multi-step process. Mixing generally is conducted at a temperature between ambient and about 80° C., for example in the range of room temperature to 55° C. The resulting negative paste is then pasted onto the grid as in step 80 of FIG. 1, and dried and cured, as in steps 100 and 115, respectively. A positive plate and negative plate are then assembled, as in step 120, to form a green battery. The cured negative material comprising tribasic lead sulfate crystals is converted by electrochemical reduction to sponge lead under the influence of the expander during formation step 130.

Figure 3:
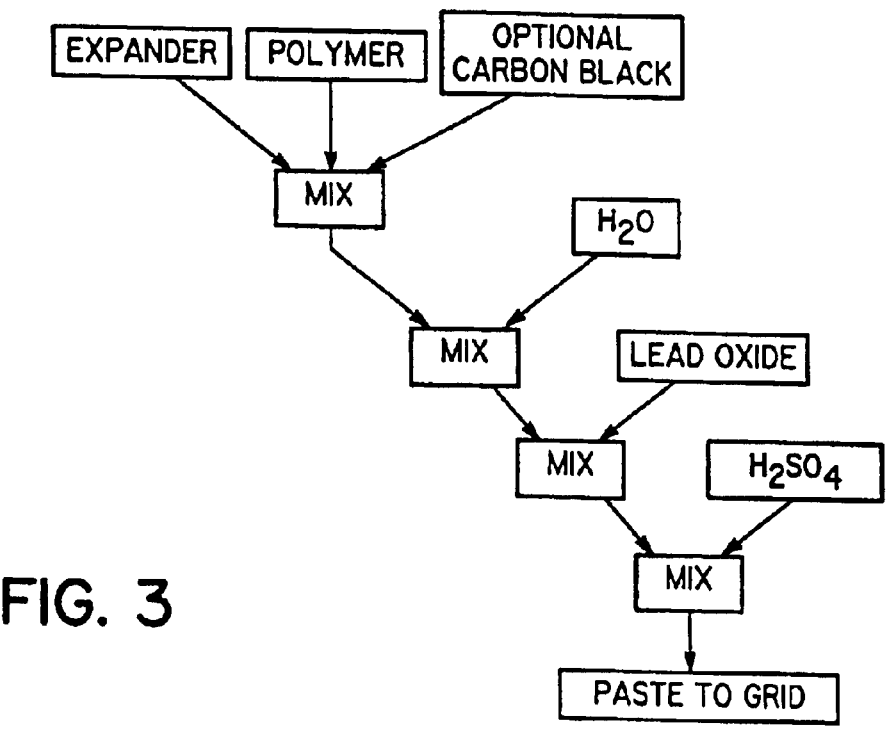

FIGS. 3–6 provide flow diagrams for embodiments of a method of the present invention illustrating several possibilities for adding the polymer and optional carbon black to the paste composition. In FIG. 3, the polymer and optional carbon black are mixed with the expander first, to form a modified expander, and then the conventional process is carried out. Specifically, the modified expander is mixed with water, then mixed with lead oxide, then mixed with sulfuric acid and pasted to the grid. Commercial suppliers of the expanders used in negative plate compositions could thus supply a modified expander in accordance with the present invention that could be used with conventional plate-making methods.

Figure 4:
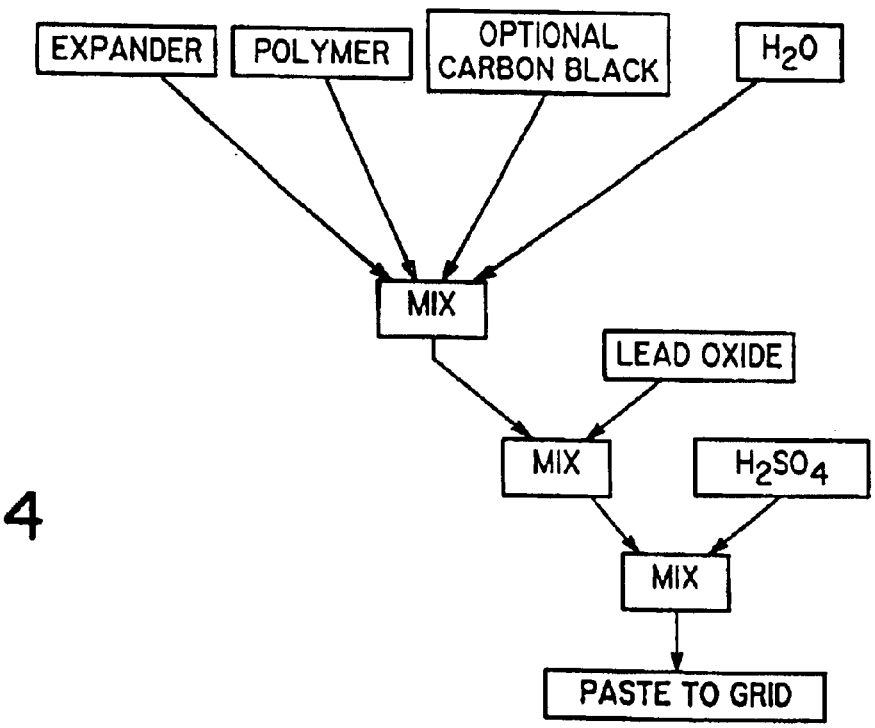

In FIG. 4, the polymer, optional carbon black, expander and water are mixed together first, then lead oxide is mixed into the paste. Finally, sulfuric acid is added to form the negative paste material and this mixture is pasted onto the grid.

Figure 5:
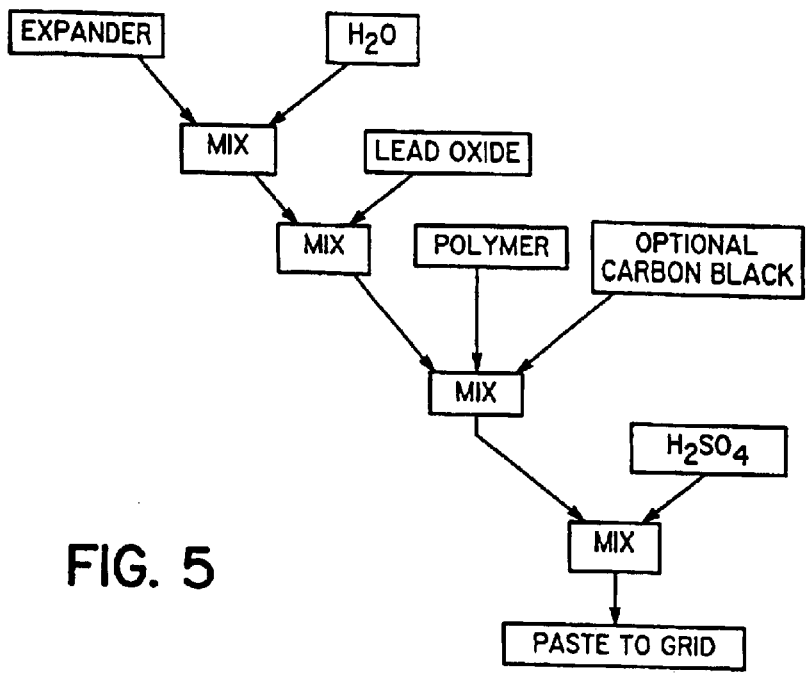

In FIG. 5, the expander is first mixed with water and then with lead oxide. The polymer and optional carbon black are then added. Finally, sulfuric acid is added to form the negative paste material and this mixture is pasted onto the grid.

Figure 6:
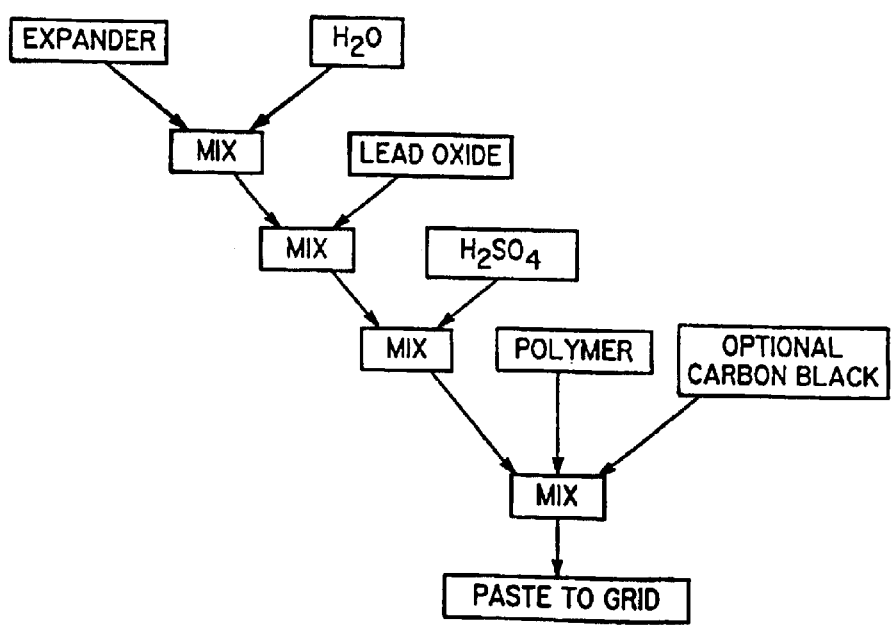

In FIG. 6, the expander is first mixed with water, then with lead oxide, and then with sulfuric acid. The polymer and optional carbon black are added last, and then the negative paste material is pasted onto the grid.

Regardless of when the polymer and optional high conductivity material, such as carbon black, are added in the negative paste mixing process, the polymer and optional carbon black absorb on the inactive lead sulfate crystals and facilitate the later reduction of $Pb^{2+}$ ions to Pb on the high surface area of the carbon compounds. The organic materials keep lead sulfate in an active state and make the reaction of lead sulfate to lead easier, and thus fewer oversized crystals are formed, thereby improving shrinkage in the negative active material.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. For example, polymers and high conductivity materials other than those specifically identified herein can be used in the present invention. The invention in its broader aspects is therefore not limited to the specific details, representative apparatus and method and illustrative examples shown and described. Accordingly, departures may be made from such details without departing from the scope or spirit of applicant's general inventive concept.

What is claimed is:

1. A negative plate-making process for a lead acid battery comprising:
   mixing together a polymer, an expander, water, lead oxide and sulfuric acid to form a negative paste composition comprising basic lead sulfate crystals and the polymer; and
   pasting the negative paste composition onto a grid where the paste is dried to form a negative battery plate of the lead acid battery.

2. The process of claim 1, wherein the polymer comprises a C—OH functional group.

3. The process of claim 1, wherein the polymer comprises a C=O functional group.

4. The process of claim 1, wherein the polymer is polyvinylpyrrolidone or polyvinyl alcohol.

5. The process of claim 1 further comprising adding a high conductivity material to the negative paste composition to increase the ionic conductivity of the paste composition to a desired value.

6. The process of claim 5, wherein the high conductivity material is carbon black.

7. The process of claim 1, wherein the expander comprises carbon black, $BaSO_4$ and a lignosulfonate.

8. The process of claim 7, further comprising adding an additional amount of carbon black to the negative paste composition to increase the ionic conductivity of the paste composition to a desired value.

9. The process of claim 1, wherein the polymer is added in an amount of about 0.01–2 wt. % of the weight of the lead oxide.

10. The process of claim 1, wherein mixing together comprises: first, combining the polymer and the expander; second, mixing in the water; third, mixing in the lead oxide; and fourth, mixing in the sulfuric acid.

11. The process of claim 1, wherein mixing, together comprises: first, combining the polymer, the expander and the water; second, mixing in the lead oxide; and third, mixing in the sulfuric acid.

12. The process of claim 1, wherein mixing, together comprises: first, combining the expander and the water; second, mixing in the lead oxide; third, mixing in the polymer; and fourth, mixing in the sulfuric acid.

13. The process of claim 1, wherein mixing together comprises: first, combining the expander and the water; second, mixing, in the lead oxide; third, mixing in the sulfuric acid; and fourth, mixing in the polymer.

14. A negative plate-making process for a lead acid battery comprising:
    mixing together an expander, water, lead oxide, sulfuric acid, and a polymer in an amount of about 0.01–2 wt. % of the weight of lead oxide to form a polymer-containing paste comprising basic lead sulfate crystals;
    further adding carbon black in an amount sufficient to increase the conductivity of the paste to a desired value; and
    pasting the polymer-containing paste onto a grid where the paste is dried to form a negative battery plate of the lead acid battery.

15. The process of claim 14, wherein the polymer comprises a C—OH functional group.

16. The process of claim 14, wherein the polymer comprises a C=O functional group.

17. The process of claim 14, wherein the polymer is polyvinylpyrrolidone or polyvinyl alcohol.

18. The process of claim 14, wherein the expander comprises carbon black, $BaSO_4$ and a lignosulfonate, and wherein the further addition of carbon black to the paste is in an amount in addition to the carbon black in the expander.

19. The process of claim 14, wherein the steps of mixing together and further adding comprise: first, combining the polymer, the carbon black and the expander; second, mixing in the water; third, mixing in the lead oxide; and fourth, mixing in the sulfuric acid.

20. The process of claim 14, wherein the steps of mixing together and further adding comprise: first, combining the polymer, the carbon black, the expander and the water; second, mixing in the lead oxide; and third, mixing in the sulfuric acid.

21. The process of claim 14, wherein the steps of mixing together and further adding comprise: first, combining the expander and the water; second, mixing in the lead oxide; third, mixing in the polymer and the carbon black; and fourth, mixing in the sulfuric acid.

22. The process of claim 14, wherein the steps of mixing together and further adding comprise: first, combining the expander and the water; second, mixing in the lead oxide; third, mixing in the sulfuric acid; and fourth, mixing in the polymer and the carbon black.

23. A negative plate-making process for a lead acid battery comprising:
    providing an expander, water, lead oxide and sulfuric acid, the expander comprising a lignosulfonate, $BaSO_4$, and a first amount of carbon black;
    providing a polymer in an amount of about 0.01–2 wt. % of the weight of lead oxide, wherein the polymer is polyvinylpyrrolidone or polyvinyl alcohol;
    mixing together the expander, water, lead oxide, sulfuric acid and polymer to form a negative paste composition comprising tribasic lead sulfate crystals, the expander and the polymer absorbed on the surfaces of the crystals;
    applying the negative paste composition to a grid and drying and curing the paste to form a negative battery plate of the lead acid battery;
    assembling a positive battery plate and the negative battery plate to form a green battery and converting the tribasic lead sulfate to sponge lead by electrochemical reduction.

24. The process of claim 23 further comprising providing a second amount of carbon black sufficient to increase the conductivity of the paste to a desired value.

25. The process of claim 23, wherein mixing together comprises: first, combining the polymer and the expander;

second, mixing in the water; third, mixing in the lead oxide; and fourth, mixing in the sulfuric acid.

26. The process of claim 23, wherein mixing together comprises: first, combining the polymer, the expander and the water; second, mixing in the lead oxide; and third, mixing in the sulfuric acid.

27. The process of claim 23, wherein mixing together comprises: first, combining the expander and the water; second, mixing in the lead oxide; third, mixing in the polymer; and fourth, mixing in the sulfuric acid.

28. The process of claim 23, wherein mixing together comprises: first, combining the expander and the water; second, mixing in the lead oxide; third, mixing in the sulfuric acid; and fourth, mixing in the polymer.

* * * * *